(12) United States Patent
Huffman et al.

(10) Patent No.: US 9,317,212 B2
(45) Date of Patent: Apr. 19, 2016

(54) METHOD AND APPARATUS FOR CONTROLLING A STORAGE DEVICE

(71) Applicant: Intel Corporation, Santa Clara, CA (US)

(72) Inventors: Amber D. Huffman, Banks, OR (US); Knut S. Grimsrud, Forest Grove, OR (US); Thomas J. Barnes, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 13/718,422

(22) Filed: Dec. 18, 2012

(65) Prior Publication Data

US 2014/0173242 A1 Jun. 19, 2014

(51) Int. Cl.
*G06F 12/00* (2006.01)
*G06F 3/06* (2006.01)
*G06F 1/32* (2006.01)

(52) U.S. Cl.
CPC ............ *G06F 3/0634* (2013.01); *G06F 1/3206* (2013.01); *G06F 1/3268* (2013.01); *G06F 3/061* (2013.01); *G06F 3/0605* (2013.01); *G06F 3/0625* (2013.01); *G06F 3/0679* (2013.01); *Y02B 60/1246* (2013.01)

(58) Field of Classification Search
None
See application file for complete search history.

(56) References Cited

U.S. PATENT DOCUMENTS

| 2003/0225969 A1* | 12/2003 | Uchida et al. ................. 711/112 |
| 2006/0010302 A1* | 1/2006 | Yamamoto et al. ........... 711/163 |
| 2007/0283178 A1 | 12/2007 | Dodeja et al. |
| 2008/0307238 A1 | 12/2008 | Bieswanger et al. |

FOREIGN PATENT DOCUMENTS

| EP | 2 309 655 A1 | 4/2011 |
| WO | 2009/022302 A1 | 2/2009 |
| WO | 2009/088709 A2 | 7/2009 |

OTHER PUBLICATIONS

International Search Report and written Opinion received for PCT Patent Application No. PCT/US2013/045601, mailed on Aug. 27, 2013, 10 pages.

\* cited by examiner

*Primary Examiner* — Midys Rojas
(74) *Attorney, Agent, or Firm* — Chapin IP Law, LLC

(57) ABSTRACT

A mass storage device such as a disk drive or SSD (solid state drive) employs optimization logic for reduced power consumption in a host personal electronic device that identifies and prioritizes performance and power trade-offs by considering user expectations, user presence and application responsiveness. The storage device receives commands and information from the host device indicative of user expectations about application invocation, data freshness, and usage patterns, and determines a operational state indicative of behavior settings for reducing power consumption while maintaining the performance constraints required by the user expectations. The granularity of performance considerations communicated from the host device to the mass storage device is expanded to permit the storage device to determine, based on performance constraints from user expectations, appropriate and specific power reduction measures for maintaining the user experience.

19 Claims, 5 Drawing Sheets

METHOD AND APPARATUS FOR CONTROLLING A STORAGE DEVICE

BACKGROUND

Personal electronic devices such as tablets, laptops and notebooks are gaining in popularity as applications and wireless support continue to grow for such devices.

Further, advances in smartphone development brings similar computing capability to handheld devices having "cell phone" sized packages. These increasingly pervasive devices are generating new usage models, such as automatically updating e-mail, social media, and other information in the background while the user is not present. New usage models have different vectors of what is valuable. For example, when the user is not present, performance requirements may be minimal whereas ensuring low power to avoid battery drain is critical; however, when the user is present, performance is critical.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
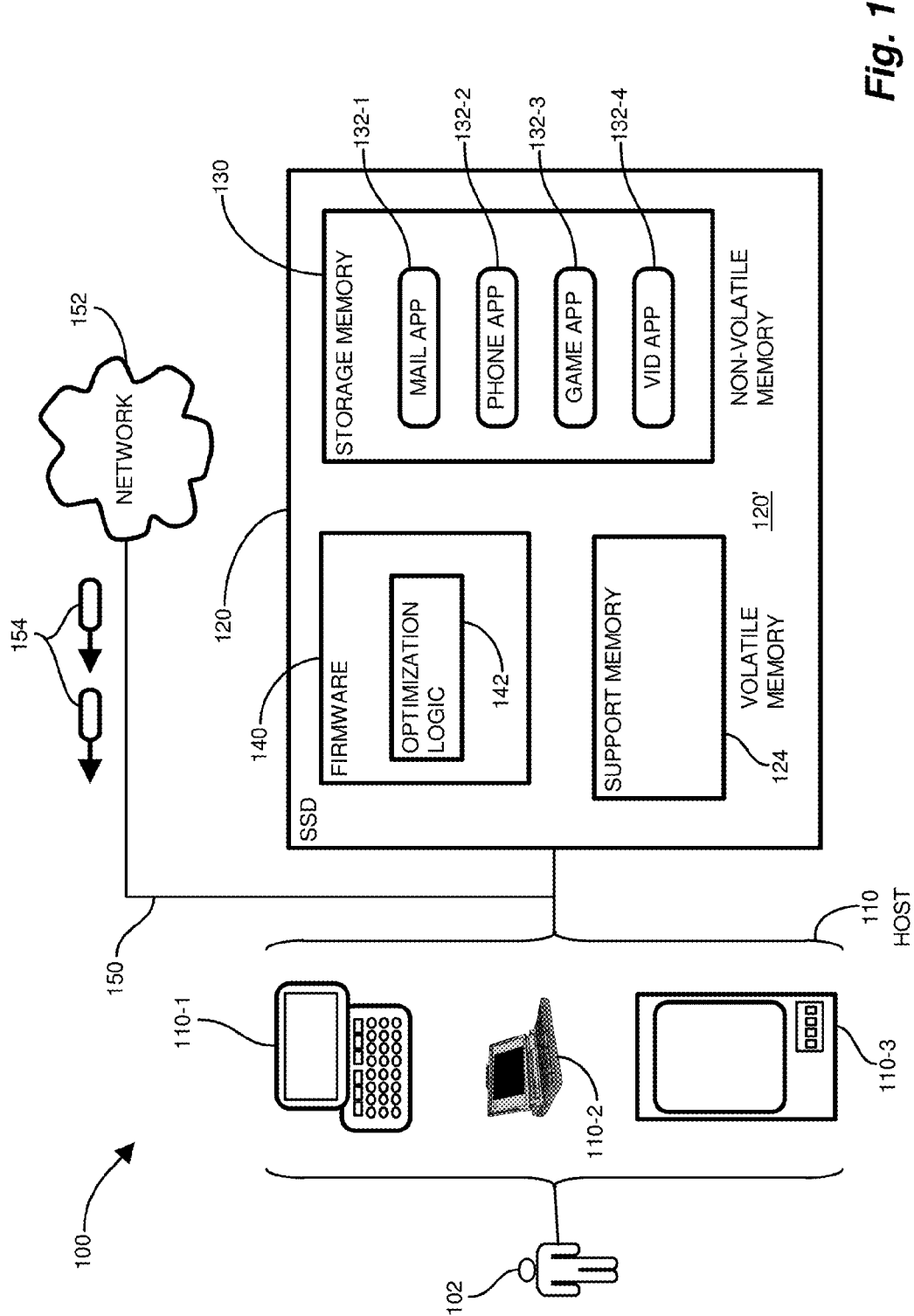
FIG. 1 is a context diagram of a personal electronic device incorporating behavior management as disclosed herein.

A mass storage device such as a disk drive or SSD (solid state drive) employs optimization logic for managing behavior of the mass storage device for benefits such as reduced power consumption in a host personal electronic device that identifies and prioritizes performance, power, acoustic, and other trade-offs by considering user expectations for various usage models.

The storage device receives commands and information from the host device based on the usage model invoked that indicates performance levels (e.g., I/Os (Input/output) per second or sequential read/write bandwidth), maximum peak power and/or TDP, average power, resume latency for satisfying a read or write, acoustic noise level (e.g., decibel level), and other attributes. The power information may be used to guide storage operations in which high performance operations may be bypassed in in favor of slower but functionally equivalent and less power consuming alternatives. The acoustic information may be used to guide device operation, for example, in a low noise environment a hard drive may spin up its media more slowly to minimize any perceptible noise (which comes at a cost to performance). By communicating this information to the storage device, end to end tradeoffs in the system can be made based on the usage model. In other words, the drive responds to information from the host in order to meet the information/command provided. In a particular configuration, the frequency of email updates is determined by the host, not the storage, however the drive may provide recommended access modes and/or sound levels in response to the command.

In response to information provided by the host device indicating desired behavior, the storage device may in turn respond with information that enables the host to optimize access to the storage device so as to achieve the desired behavior. For example, when the host indicates a power target to the storage device, the storage device may respond with information telling the host how often it can be accessed while meeting the specified power target.

Conventional approaches to optimizing power and performance tend to be extreme in favoring one or the other. For example, the SLEEP mode for ATA devices today requires a reset of the device interface before any command can be completed. In contrast, the mechanisms described here offer the ability to have a spectrum of performance, power, acoustic, and other attributes to meet the dynamic usage models that are being invented at an ever more rapid pace.

It would be beneficial to provide a higher level of granularity by employing optimization logic for streamlining mass storage device operation to more closely align with user expectations. Disclosed herein is a granular approach more suited to differing usage models where the storage device can participate in a system level optimization for the particular usage model. Storage devices in conventional approaches do not have optimization logic responsive to behavior commands for adjusting behavior of the storage device, in which the storage device actively manages internal operations such as memory usage, power consumption, and noise level, to name several. Conventional approaches may modify the driver behavior based on the system state or other optimization logic, but such control is not carried all the way to the storage device. Accordingly, configurations herein substantially overcome shortcomings of conventional storage device behavior and power management schemes and enable new optimization points for parameters like noise. Optimization logic identifies and implements settings on the storage device in response to an information profile or other behavior management information provided by the host.

Storage device behavior and power management as disclosed herein achieves active behavior management of the storage device for features such as power optimization commensurate with user expectations by actively managing functions of the storage device behavior for attributes or characteristics such as power conservation or maximum performance. Such power optimization may be driven by industry standards of battery longevity, such as a usage rate and duration of power, and device performance, such as maintaining certain applications updated or "fresh" with data updates even in a standby state, or resuming an active, or full performance state, within a predetermined amount of time. The power optimization balances a computed need for performance with expectations of battery longevity. For example, emerging standards may require performance benchmarks, such as 5% over 16 hours. The optimization logic employed by the storage device may turn off functions, turn on functions, or shift functions from one type of memory to another type of memory based on the power consumption rate and performance (speed) of the respective memory. Such fine grain control is not supported by conventional devices, which only power down certain subsystems such as rotating media and host interfaces in a passive response to a power events, and which require substantial context switching time between their standby and active states. It should be noted that the storage device determines and controls such functions within the drive itself, generally powering down internal subsystems, and not entire disks or external monitors Active behavior management of the storage device as disclosed below allows the storage device to modify the behavior of the storage device in response to behavior or hint commands sent by the host. The behavior commands invoke optimization logic in the storage device so that the storage device itself modifies functions and operations to achieve the result expected by the command. For example, there may be a plurality of operational states that correspond to user presence and user expectations of the host device. Each of the operational states includes one or more behavior settings that correspond to storage device operation, such as disabling caches, moving functions to different memory structures, or modifying drive speed to achieve acoustic levels. The behavior settings are actively identified and pursued by the optimization logic in the storage device, rather than imposed by the host device, such as a conventional drive spin-down by simply cutting power to the drive.

FIG. 1 is a context diagram of a personal electronic device incorporating active behavior management as disclosed herein. Referring to FIG. 1, in a computing environment 100, a user 102 employs a personal electronic device 110, such as a smartphone 110-1, laptop or notebook 110-2, tablet 110-3, or other suitable device 110 generally. The personal electronic device 110 employs a mass storage device 120 such as a solid state drive 120' (SSD); however conventional magnetic disk drives and hybrid drives having both rotational and solid state components may be employed, discussed further below.

The mass storage device (storage device) 120 supports the personal electronic device, or host device 110, by providing nonvolatile data storage and retrieval support. The storage device 120 employs storage memory 130 for primary storage. The storage memory 130 comprises an NAND flash memory, although any suitable non-volatile memory may be employed, for example 3D cross-point memory, such as phase change memory (PCM), or rotating magnetic media, to name several. Firmware 140 performs management of the storage memory 130 for supporting storage and retrieval requests from the host device 110, typically in response to device drivers on the host device 110. The firmware 140 includes optimization logic 142 for computing a standby level or operational state corresponding to other behavior functions in response to a behavior command from the host device 110, and adjusts power consumption and other behavior settings accordingly. The storage memory 130 stores data comprising executable code, operating systems, configuration information, and content for applications 132-1 . . . 132-4 (132 generally), such as mail 132-1, cellphone 132-2, games 132-3 and video rendering 132-4. Other applications may be employed per the preference of the user 102. The storage device 120 may also include support memory 124 for enhancing performance, typically volatile memory employed for functions such as caching, paging, and indexing. Support memory 124 may include any suitable volatile memory, such as DRAM (Dynamic Random Access Memory), SRAM (Static Random Access Memory) or other high-speed volatile memory. The host device 110 typically maintains a connection 150 to an external network 152, for receiving external services 154 such as mail and video, in conjunction with one of the applications 132.

Figure 2:
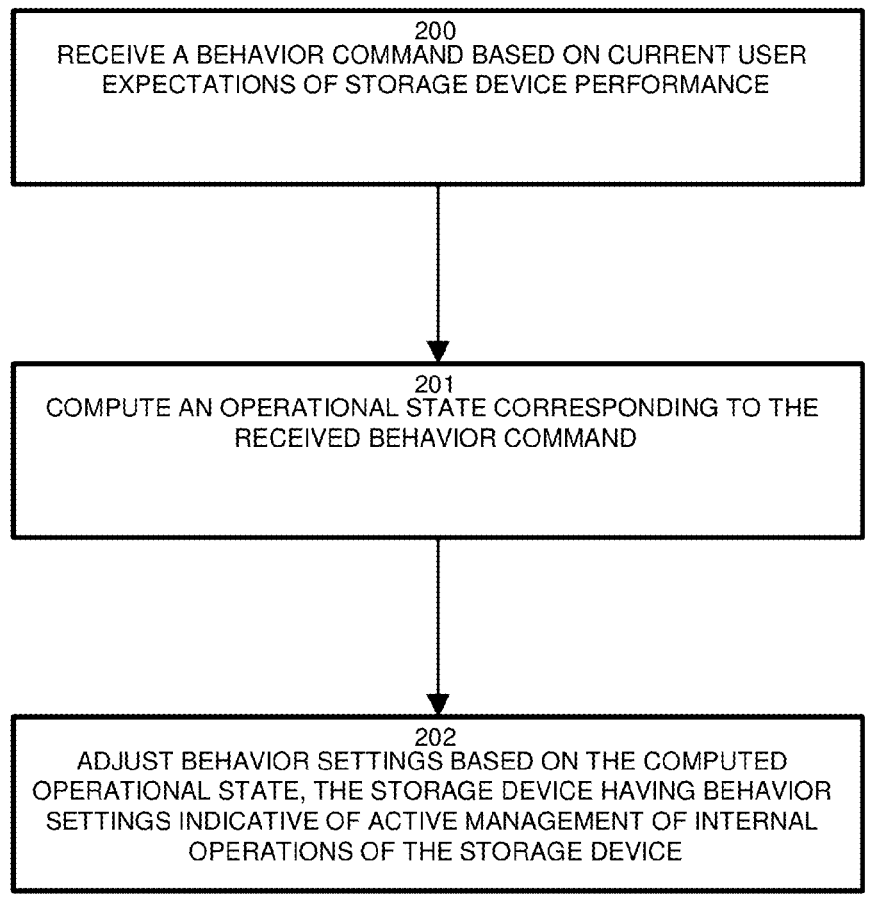
FIG. 2 is a flowchart of storage device behavior management techniques in the device of FIG. 1.

FIG. 2 is a flowchart of storage device behavior management techniques in the device of FIG. 1. Referring to FIGS. 1 and 2, the method of controlling a storage device as disclosed herein includes receiving a behavior command based on current user expectations of storage device performance, as depicted at step 200. Conventional approaches do not actively monitor or control storage device behavior, such as to compute or determine a behavior command, but rather may switch peripherals on and off following a timeout, for example by allowing a disk drive to spin down. Such non-granular approaches require substantial time to spin the drive back up for resuming a user present state. Further, conventional approaches do not compute or identify power saving settings at the storage device, but rather respond to an "off" or "standby" command from the host device 110. The optimization logic 142 computes a operational state corresponding to the received behavior command, as disclosed at step 201, and the storage device 120 behavior settings based on the computed operational state, in which the storage device has behavior settings indicative of active management of internal operations as depicted at step 202. Various behavior settings may be achieved by invoking various sets of operational states. In the example configuration, the behavior settings may include acoustic noise level, I/Os (Input/Outputs) per second, sequential read/write bandwidth, maximum peak power, average power, and resume latency for satisfying an I/O. The operational states may designate a value for one or more of the behavior settings to be applied by that operation state, such that active management of the storage device further comprises executing instructions, stored in the optimization logic, for implementing the designated values.

For example, in particular configurations, various power saving or behavior settings may be implemented; in general power saving settings will be effected in response to a detected non-presence of the user, and behavior settings enacted to return the device to full performance once the user presence is reestablished. In the case of power saving behavior, both power saving and performance settings are generally mutually exclusive—as performance is favored, more power is required and hence, power saving is reduced.

Figure 3:
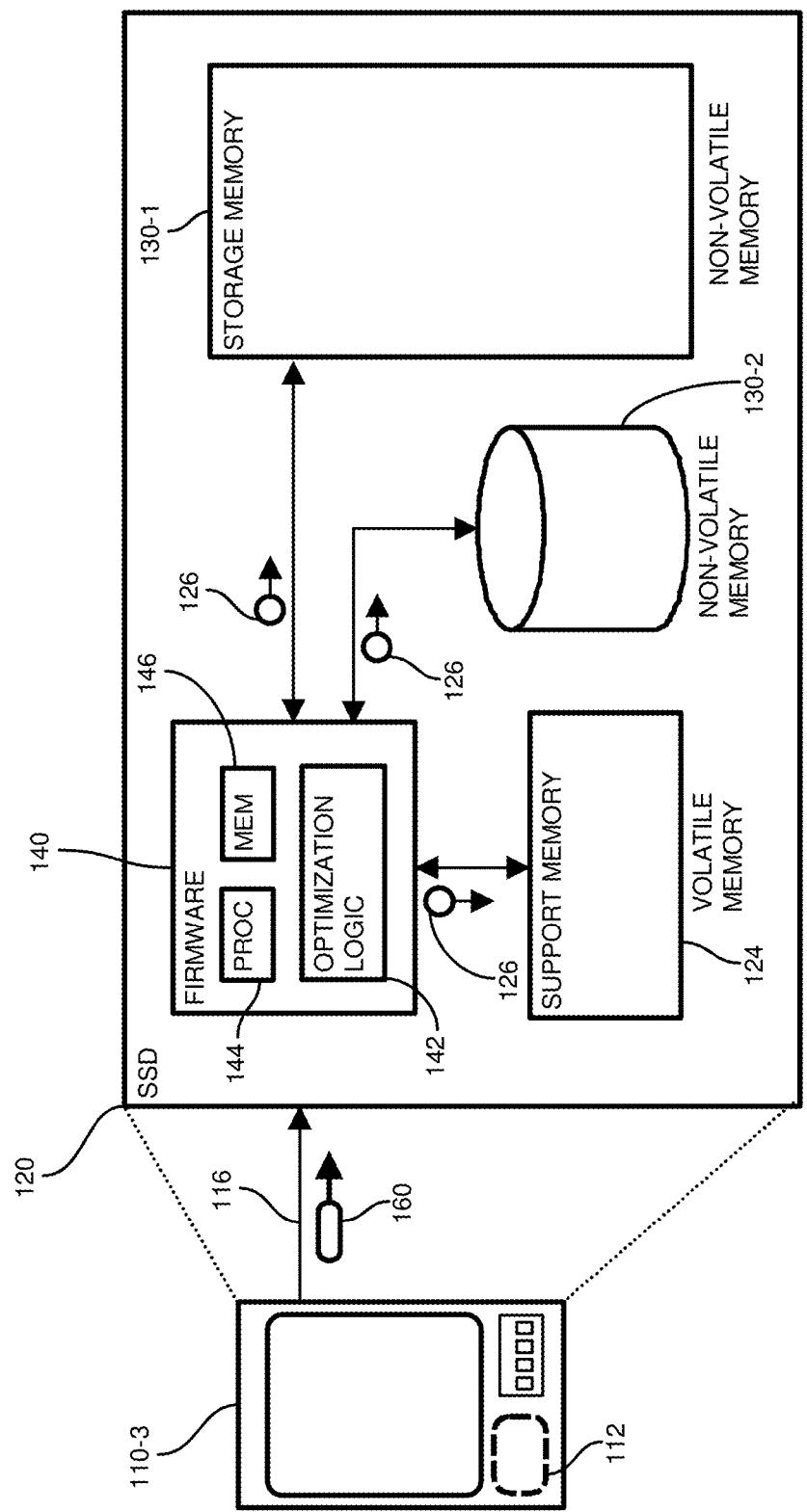
FIG. 3 shows a personal electronic device having a mass storage peripheral operable according to the behavior management approaches of FIG. 2

FIG. 3 shows a personal electronic device 110 having a mass storage peripheral operable according to the behavior management approaches of FIG. 2. Referring to FIGS. 1 and 3, the host device 110 (tablet 110-3 employed as an example) employs a hybrid storage device 120 including non-volatile solid state memory 130-1, such as NAND, and disk memory 130-2, including rotational magnetic media. A battery 112 provides power for the storage device 120 and the host device 110 as a whole, and is typically a primary power source for portable electronic devices. The firmware 140 also includes a processor 144 and high speed memory 146 (typically DRAM) for computing and implementing the behavior settings as now discussed in further detail. For example, while the optimization logic 142 performs adjustments for both power conservation and performance improvement, generally these objectives are complementary, in that a power conservation setting reduces performance, and a performance constraint conserves power.

In operation, the host device 110 sends a behavior command 160 to the storage device 120 via interface 116. Alternatively, similar behavior commands may be sent to other peripheral devices for similar power conservation measures. Conventional approaches do not employ an interface 116 for firmware 140 responsive to behavior commands 160 from the host device 110. The firmware 140 receives the behavior command 160, and employs the optimization logic 142 for computing a operational state for achieving a desired power/performance balance. The optimization logic 142 then sends behavior settings 126 to one or more of the subsystems of the storage device 120, such as NAND storage memory 130-1, disk memory 130-2, and support memory 124, for achieving the appropriate level of power conservation (or performance enhancement, if returning to full power/performance). The optimization logic 142 may perform actions such as shifting functions from support memory 124 to storage memory 130-1, thus allowing shutdown of the support memory 124. Certain speed enhancement functions, such as mapping and caching functions, may be disabled altogether, thus allowing similar capability but through more time consuming access operations.

For example, the optimization logic may change the non-volatile memory (NVM) management algorithms to optimize for power rather than performance. For example, many current SSD implementations today utilize DRAM 124 to aid in fast look-up of data structures to satisfy read & write commands. When in a "power optimized" mode, the SSD could turn off the DRAM and use a lower performance NVM management algorithm that only makes use of the SRAM internal to the SSD Firmware 140.

Other settings modified by the optimization logic 142 may change the speed at which a slumber state is requested, such as defined by the Serial ATA (SATA) International Organization. In a typical implementation, the active power state on average is 400 mW or more. In slumber, the device is often <50 mW average power, so it is significant in a power optimized mode to recover quickly. On reception of this hint or setting, the SSD may assert slumber after 1 to 5 ms of idle (versus 25 to 100 ms of idle in conventional approaches).

Figure 4:
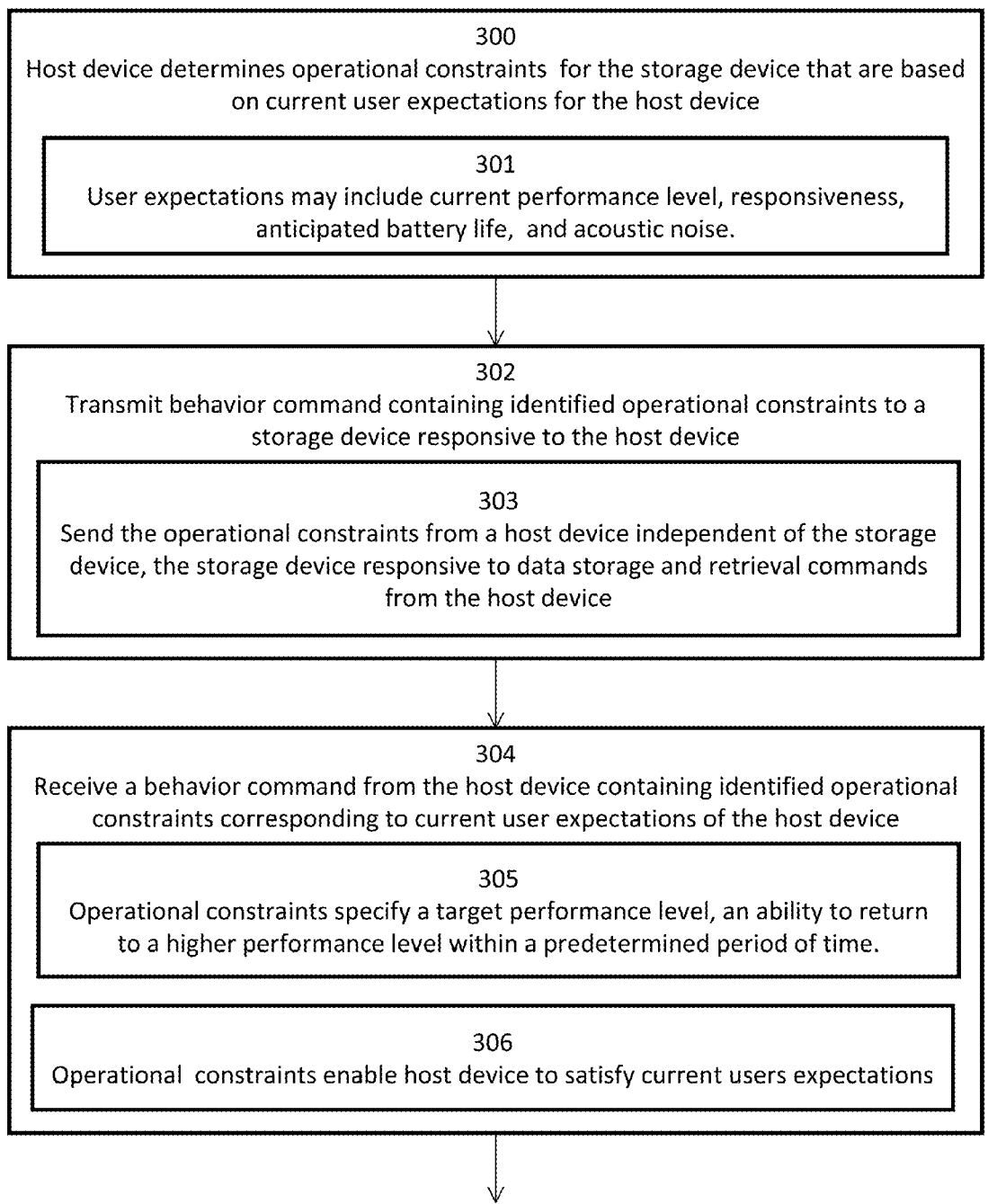
FIGS. 4-5 are a flowchart of exemplary behavior depicting power management approaches in the device of FIG. 3.
Figure 5:
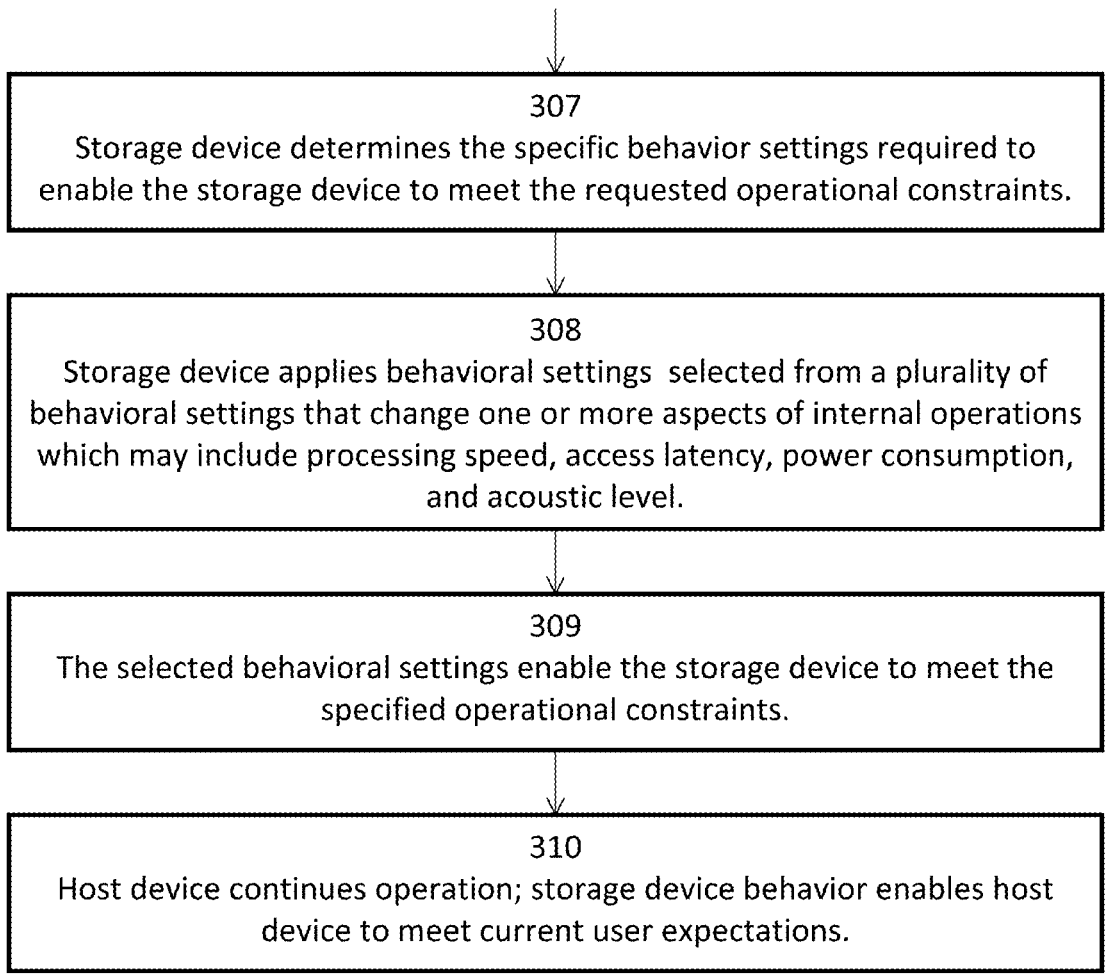

FIGS. 4-5 are a flowchart of an example behavior control exchange including power management approaches in the device of FIG. 3. A variety of operational states concerned with power management (i.e. active, standby, sleep, high performance, etc) as well as operational states defining other behavioral settings of the storage device may be employed. As an example, such operational states may result from commands promulgated by standards such as the SATA organization cited above, and the NVM Express (NVMe) Work Group specifications, promulgated by Intel® corporation, of Santa Clara, Calif. Configurations herein may be employed in the implementation of such standards. Power management is employed as an illustrative use case and should not be construed as limiting the approach as defined herein. Various behavior attributes of the storage device may be controlled in response to the behavior command 160 from the host. It should be emphasized that a high granularity of performance and power trade-offs are envisioned, in contrast to conventional sleep/wake control, typically in a master/slave relationship. Generally, multiple tiers of operational capability are supported, ranging from full performance in favor of power saving measures, to maximum power conservation in view of performance concessions. Configurations herein have generally taken the perspective of full performance as the "normal" or "default" state, which is then augmented by power saving measures in a standby state of varying degree. However, alternate arrangements may employ any performance/power state as the "normal" state and augment power and performance along the continuum of power saving measures.

Referring to FIGS. 3-5, a method of power management for a personal electronic device 110 includes, at step 300, identifying, at a host device 110, operational constraints corresponding to user 102 expectations of the host device 110. User expectations include, but are not limited to, desired performance level, responsiveness, anticipated battery life, and acoustic noise, as depicted at step 301. The host device 110 typically operates under an operating system which may impose particular standards or practices for power management. The operating system determines user expectations based on multiple criteria, for example, an identifier user presence, currently launched applications, and a history of application activity indicative of computational intensity and responsiveness of the launched applications.

The operational constraints are chosen so as to enable the host device to satisfy current user expectations. For example, while the storage system operates under the specified operation constraints, the host system may be required to maintain background updating of externally sourced interactive applications 132, in which the background updating is such that the interactive application resumes in an updated state. Upon commencement of use from an idle period, the determination of user presence by the host device will return a live screen with fresh data for ongoing applications, such as email and real-time media (i.e. social media applications). The user expectations may therefore extend to a readiness setting indicative of a predetermined interval for returning to full performance, and a maintenance setting denoting applications receiving fresh updates of real time data. A power setting may determine a maximum rate of power drain, as in the example above.

The host 110 transmits the identified operational constraints as a behavioral command 160 to a storage device 120 responsive to the host device 110, as depicted at step 302. This includes sending the operational constraints from a host device 110 independent of the storage device 120, such that the storage device 120 is responsive to data storage and retrieval commands from the host device 110, as depicted at step 303, but otherwise maintains separate firmware for performing power optimization consistent with the received behavior command 160.

At step 304, the storage device 120 receives the behavior command 160 based on current user expectations of storage device performance. The user expectations include a current performance level and an ability to return to a higher performance level within a predetermined amount of time, as depicted at step 305. In the example arrangement, the storage device 120 may be a hybrid device having memory portions including magnetic media and solid state memory, such that the solid state memory further encompasses volatile and non-volatile portions. Adjusting the power consumption and behavior settings may include transferring retrieval operations between the memory portions, such as turning off the non-volatile support memory 124 in favor of a power saving but longer addressing or lookup operation. In general, the operational constraints are selected to enable the host device to satisfy current user expectations, as depicted at step 306.

Accordingly, the storage device 120 invokes the optimization logic 142 to determine an operational state that satisfies the operational constraints indicated in the received behavior command 160 as depicted at step 307.

Based on the operational state determined by the optimization logic 142, the storage device applies behavioral settings selected from a plurality of behavioral settings that change one or more aspects of internal storage device operation such as I/O rate, maximum bandwidth, access latency, power consumption, and acoustic level, as depicted at step 308.

The newly updated behavioral settings enable the drive to meet the specified operational constraints as shown at step 309, which in turn enables the host device to meet the current user expectations as determined in steps 300 and 301. By applying the selected behavioral settings, the storage device is enabled to meet the specified operations constraints, as depicted at step 309. Thus, the host device 110 continues operation as the storage device behavior enables the host device 110 to meet current user expectations, as shown at step 310.

Those skilled in the art should readily appreciate that the programs and methods defined herein are deliverable to a computer processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of controlling a storage device comprising:
   receiving a behavior command based on current user expectations of storage device performance, the user expectations including a current performance level and an ability to return to a faster performance level within a predetermined amount of time;
   computing an operational state corresponding to the received behavior command;
   adjusting behavior settings by adjusting power consumption and performance settings based on the computed operational state, the storage device having behavior settings indicative of active management of internal operations;
   selectively degrading performance to reduce power consumption and maintain an acceptable performance level while operating with reduced user interaction; and
   resuming full power operation with active user interaction such that applications remain launched and updated.

2. The method of claim 1 wherein the behavior settings includes at least one of acoustic noise level, I/Os per second, sequential read/write bandwidth, maximum peak power, average power, and resume latency for satisfying am I/O.

3. The method of claim 1 wherein the operational state designates a value for at least one of the behavior settings, wherein active management further comprises executing instructions to implement the designated values.

4. The method of claim 1 wherein the operational state imposes performance constraints for:
   maintaining background updating of at least one externally sourced interactive application, the background updating such that the interactive application resumes in an updated state; and
   limiting battery drain according to a predetermined rate.

5. The method of claim 4 wherein the storage device is a hybrid device having memory portions including magnetic media and solid state memory, the solid state memory having volatile and non-volatile portions, wherein adjusting the power consumption and performance settings further comprises transferring data between the volatile and non-volatile portions.

6. The method of claim 1 further comprising sending the behavior command from a host device independent of the storage device, the storage device responsive to data storage and retrieval commands from the host device.

7. The method of claim 1 wherein computing the operational state further comprises identifying a performance profile, the performance profile indicative of at least one of:
   processing speed,
   access latency,
   power consumption, and
   acoustic levels,
the identified performance profile selected from a plurality of performance profiles, each of the performance profiles adapted for invocation in response to a particular behavior command.

8. The method of claim 1, wherein the user expectations correspond to:
   a readiness setting indicative of a predetermined interval for returning to full performance;
   a maintenance setting denoting applications receiving fresh updates of real time data; and
   a power setting determining a maximum rate of power drain.

9. The method of claim 1 further comprising determining, from the behavior command, whether the storage device is to be directed for performance or power conservation measures.

10. The method of claim 1 further comprising invoking functionally equivalent and more resource conservative alternatives defined by the computed operational state.

11. A method of power management for a personal electronic device comprising:
    identifying, at a host device, performance constraints corresponding to user expectations of the host device;
    transmitting the identified performance constraints to a storage device responsive to the host device;
    computing, at the storage device, power consumption and behavior settings for achieving the identified performance constraints by adjusting power consumption and performance settings; and
    invoking optimization logic for computing the performance constraints, the user expectations based on an identifier of user presence based on an observed idle period, currently launched applications, and a history of application activity indicative of computational intensity and responsiveness of the launched applications.

12. The method of claim 11 wherein the performance constraints maintain background updating of externally sourced interactive applications, the background updating such that the interactive application resumes in an updated state.

13. The method of claim 12 wherein the user expectations include a current performance level and an ability to return to a faster performance level within a predetermined amount of time.

14. The method of claim 11 further comprising sending the performance constraints from a host device independent of the storage device, the storage device responsive to data storage and retrieval commands from the host device.

15. A method of power management for a personal electronic device comprising:
    identifying, at a host device, performance constraints corresponding to user expectations of the host device;
    transmitting the identified performance constraints to a storage device responsive to the host device;
    computing, at the storage device, power consumption and behavior settings for achieving the identified performance constraints by adjusting power consumption and performance settings;

selectively degrading performance to reduce power consumption and maintaining an acceptable performance level while operating with reduced user interaction; and resuming full power operation with active user interaction such that applications remain launched and updated.

16. A personal electronic device for active power management comprising:

a host device adapted to identify performance constraints corresponding to user expectations of the host device;

an interface to a storage device responsive to the host device and configured to transmit the identified performance constraints to the storage device;

the storage device operable to compute power consumption and behavior settings to achieve the identified performance constraints; and a display screen on the host device, the display screen to provide output based on the user expectations and resulting from adjustment of power consumption and performance settings.

17. The device of claim 16 wherein the storage device further includes optimization logic, the optimization logic for:

selectively degrade performance to reduce power consumption and maintain an acceptable performance level while operating with reduced user interaction; and resume full power operation with active user interaction such that applications remain launched and updated.

18. The device of claim 17 wherein the storage device includes at least one of a NAND flash memory, 3D cross-point memory, read only memory (ROM), electrically erasable programmable read only memory (EEPROM), DRAM (Dynamic Random Access Memory), Synchronous Dynamic Random Access Memory (SDRAM) or RAMBUS Dynamic Random Access Memory (RDRAM).

19. A computer program product having instructions encoded on a non-transitory computer readable storage medium that, when executed by a processor, perform a method of power management for a personal electronic device, the method comprising:

receiving a behavior command based on current user expectations of storage device performance;

computing a operational state corresponding to the received behavior command;

adjusting behavior settings by adjusting power consumption and performance settings based on the computed operational state, the storage device having behavior settings indicative of active management of internal operations:

selectively degrading performance to reduce power consumption and maintaining an acceptable performance level while operating with reduced user interaction; and resuming full power operation with active user interaction such that applications remain launched and updated.

* * * * *